United States Patent
Lyle et al.

(10) Patent No.: US 12,184,664 B1
(45) Date of Patent: *Dec. 31, 2024

(54) DISTRIBUTED LEDGER FOR NETWORK SECURITY MANAGEMENT

(71) Applicant: United Services Automobile Association (USAA), San Antonio, TX (US)

(72) Inventors: Ruthie D. Lyle, Durham, NC (US); Bharat Prasad, San Antonio, TX (US); Eric David Schroeder, San Antonio, TX (US); Minya Liang, Redmond, WA (US); Thomas Bret Buckingham, Fair Oaks Ranch, TX (US); Gabriel C. Fernandez, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/330,001

(22) Filed: Jun. 6, 2023

Related U.S. Application Data

(63) Continuation of application No. 17/331,792, filed on May 27, 2021, now Pat. No. 11,706,231, which is a
(Continued)

(51) Int. Cl.
  *G06Q 40/00* (2023.01)
  *H04L 9/40* (2022.01)
(52) U.S. Cl.
  CPC ........ *H04L 63/126* (2013.01); *H04L 63/0823* (2013.01); *H04L 63/0861* (2013.01); *H04L 63/102* (2013.01)

(58) Field of Classification Search
  USPC .......................................................... 703/175
  See application file for complete search history.

(56) References Cited

U.S. PATENT DOCUMENTS

| | | | | |
|---|---|---|---|---|
| 6,745,221 B1 * | 6/2004 | Ronca | ..................... | H04M 3/50 370/257 |
| 2011/0202454 A1 * | 8/2011 | Ilinski | ..................... | G06Q 20/10 705/39 |

(Continued)

FOREIGN PATENT DOCUMENTS

| | | |
|---|---|---|
| AU | 2016101183 A4 | 9/2016 |
| CN | 105681301 A | 6/2016 |

(Continued)

*Primary Examiner* — Olabode Akintola
(74) *Attorney, Agent, or Firm* — Fletcher Yoder P.C.

(57) ABSTRACT

Techniques are described for managing a network through use of a security device that includes, or has access to, a blockchain node. The security device may manage a network of Internet-of-Things (IoT) devices in a home or other environment. The security device may act as an intermediary to manage secure, trusted communications between the IoT device(s) and external service(s). The security device may also provide network security features such as a network firewall. In some implementations, the security device may run a blockchain node, and the blockchain could be used to establish a verifiable home identity. The security device may interact with external resources and/or services, such as utility services, e-commerce services, and so forth, through this secure mechanism.

20 Claims, 13 Drawing Sheets

Related U.S. Application Data continuation of application No. 15/789,781, filed on Oct. 20, 2017, now Pat. No. 11,050,763.

(60) Provisional application No. 62/411,406, filed on Oct. 21, 2016.

(56) References Cited

U.S. PATENT DOCUMENTS

| | | |
|---|---|---|
| 2015/0332395 A1 | 11/2015 | Walker et al. |
| 2015/0371224 A1 | 12/2015 | Lingappa |
| 2015/0379510 A1 | 12/2015 | Smith |
| 2016/0203477 A1 | 7/2016 | Yang et al. |
| 2016/0210626 A1 | 7/2016 | Ortiz et al. |
| 2016/0248746 A1* | 8/2016 | James ............... H04L 67/12 |
| 2016/0371771 A1 | 12/2016 | Serrano et al. |
| 2017/0046664 A1 | 2/2017 | Haldenby et al. |
| 2017/0046799 A1 | 2/2017 | Chan et al. |
| 2017/0053249 A1 | 2/2017 | Tunnell et al. |
| 2017/0076306 A1 | 3/2017 | Snider et al. |
| 2017/0093915 A1* | 3/2017 | Ellis ............... H04L 67/306 |
| 2017/0103391 A1 | 4/2017 | Wilson, Jr. et al. |
| 2017/0109748 A1 | 4/2017 | Kote |
| 2017/0134161 A1 | 5/2017 | Goeringer et al. |
| 2017/0140375 A1 | 5/2017 | Kunstel |
| 2017/0221029 A1 | 8/2017 | Lund et al. |
| 2017/0228371 A1 | 8/2017 | Seger, II |
| 2017/0228704 A1 | 8/2017 | Zhou et al. |
| 2017/0228734 A1 | 8/2017 | Kurian |
| 2017/0230375 A1 | 8/2017 | Kurian |
| 2017/0236123 A1 | 8/2017 | Ali et al. |
| 2017/0237554 A1 | 8/2017 | Jacobs et al. |
| 2017/0243208 A1 | 8/2017 | Kurian et al. |
| 2017/0243217 A1* | 8/2017 | Johnsrud ............ G06Q 20/4014 |
| 2017/0270527 A1 | 9/2017 | Rampton |
| 2017/0279783 A1 | 9/2017 | Milazzo et al. |
| 2017/0286717 A1 | 10/2017 | Khi et al. |
| 2017/0287068 A1 | 10/2017 | Nugent |
| 2017/0331896 A1* | 11/2017 | Holloway ............... H04L 67/04 |
| 2017/0359338 A1* | 12/2017 | Tschofenig ............ G06F 21/44 |

FOREIGN PATENT DOCUMENTS

| | | |
|---|---|---|
| CN | 106097101 A | 11/2016 |
| CN | 106228446 A | 12/2016 |
| CN | 106339875 A | 1/2017 |
| CN | 106355488 A | 1/2017 |
| CN | 106408299 A | 2/2017 |
| CN | 106452785 A | 2/2017 |
| CN | 106453415 A | 2/2017 |
| CN | 106485167 A | 3/2017 |
| CN | 106530083 A | 3/2017 |
| CN | 106790431 A | 5/2017 |
| KR | 101590076 B1 | 2/2016 |
| WO | 2015085393 A1 | 6/2015 |
| WO | 2016154001 A1 | 9/2016 |
| WO | 2017027648 A1 | 2/2017 |
| WO | 2017065389 A1 | 4/2017 |
| WO | 2017066715 A1 | 4/2017 |
| WO | 2017091530 A1 | 6/2017 |
| WO | 2017095036 A1 | 6/2017 |
| WO | 2017136956 A1 | 8/2017 |
| WO | 2017139688 A1 | 8/2017 |

* cited by examiner

DISTRIBUTED LEDGER FOR NETWORK SECURITY MANAGEMENT

CROSS-REFERENCES TO RELATED APPLICATIONS

This patent application is a continuation of U.S. Non-Provisional patent application Ser. No. 17/331,792, titled "Distributed Ledger for Network Security Management," which was filed on May 27, 2021, which is a continuation of U.S. Non-Provisional patent application Ser. No. 15/789,781, titled "Distributed Ledger for Network Security Management," which was filed on Oct. 20, 2017, and which claim priority to and the benefit of U.S. Provisional Patent Application Ser. No. 62/411,406, titled "Distributed Ledger for Network Security Management," which was filed on Oct. 21, 2016, the entireties of which are incorporated by reference into the present disclosure for all purposes.

BACKGROUND

There has been an increase in the number of appliances, devices, vehicles, utility devices, and/or other types of objects, available for the home or other environments that include data collection, computing, sensing, and/or network communications capabilities in addition to their normal functionality. These objects, described as smart appliances, smart vehicles, smart building components, smart infrastructure components, and so forth, may be organized into an Internet of Things (IoT). The various devices on an IoT may generate data, such as sensor data, status information, and so forth, and the data may be shared among the devices over one or more wired or wireless networks. An IoT may enable devices to be sensed and controlled remotely over network(s), and the data generated by the devices may be collected, analyzed, or otherwise processed by computing devices and/or individuals.

SUMMARY

Implementations of the present disclosure are generally directed to network management. More particularly, implementations of the present disclosure are directed to managing a network of Internet-of-Things (IoT) devices using a security device and/or security software that brokers a trust relationship and/or provides secure, trusted communications between the IoT device(s) and services that are external to the IoT network.

In general, implementations of innovative aspects of the subject matter described in this specification can be embodied in a method that includes actions of: receiving a communication sent from an internet-of-things (IoT) device, the communication identifying an external service to receive the communication; accessing a digital certificate associated with the IoT device; sending the communication to the external service over a secure connection that is established, using the digital certificate, between the security computing device and the external service; and receiving, from the external service, a response to the communication and, based on determining that the response is received over the secure connection, forwarding the response from the security computing device to the IoT device.

These and other implementations can each optionally include one or more of the following innovative aspects: the digital certificate is received from a certificate authority service based on establishing a trust relationship between the security computing device and the certificate authority service; the actions further include detecting a presence of the IoT device on an IoT that is accessible, over one or more networks, by the security computing device; the actions further include adding the IoT device to a set of devices for which external communications are managed by the security computing device; adding the IoT device includes updating configuration data to include a description of the IoT device, the configuration data stored on the security computing device; the digital certificate is stored on a blockchain network that is accessible by the security computing device; the blockchain network includes a blockchain node on the security computing device; the blockchain network stores payment information; the communication indicates a transaction with the external service; the security computing device employs the payment information to initiate the transaction, for the IoT device, with the external service; and/or the actions further include providing a user interface that presents status information regarding the IoT device, the user interface accessible through a biometric authentication mode.

Other implementations of any of the above aspects include corresponding methods, apparatus, and/or computer programs that are configured to perform the actions of the system. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations provide various technical advantages over, and/or technical improvements to, other previously available solutions. Implementations provide a secure platform that provides a single point of interface for controlling IoT devices, instead of a traditional system in which the user is required to use multiple applications to control different IoT devices provided by different vendors. Accordingly, implementations consume less processing power, storage, active memory, network bandwidth, and/or other computing resources on the user's portable computing device, by running a single application to interface with a whole IoT network instead of multiple applications to control different IoT device(s).

Traditionally, users who employ IoT device(s) in their homes are vulnerable to intrusion and/or data theft, leading to loss of privacy, property theft, financial harm, and/or other injuries. In some implementations, the platform for IoT device security management and access control management employs strong, biometric-based authentication to ensure that only authorized personnel are able to access the system and provision IoT devices for financial transactions or otherwise, ensuring that the risk of theft through the IoT network is minimal. Moreover, the platform provides a single interface that the user can employ to view and manage IoT devices, providing for greater security and a better user experience compared to traditional solutions in which a user may need to interface with multiple applications to manage different types of IoT devices supplied by different vendors. Moreover, the implementations described herein enables an individual (e.g., the homeowner) to better control their space (e.g., their home), given that the implementations provide control over the security of IoT device(s), the data generated from these devices, and the privacy of the actions they take and device(s) they use.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1A:
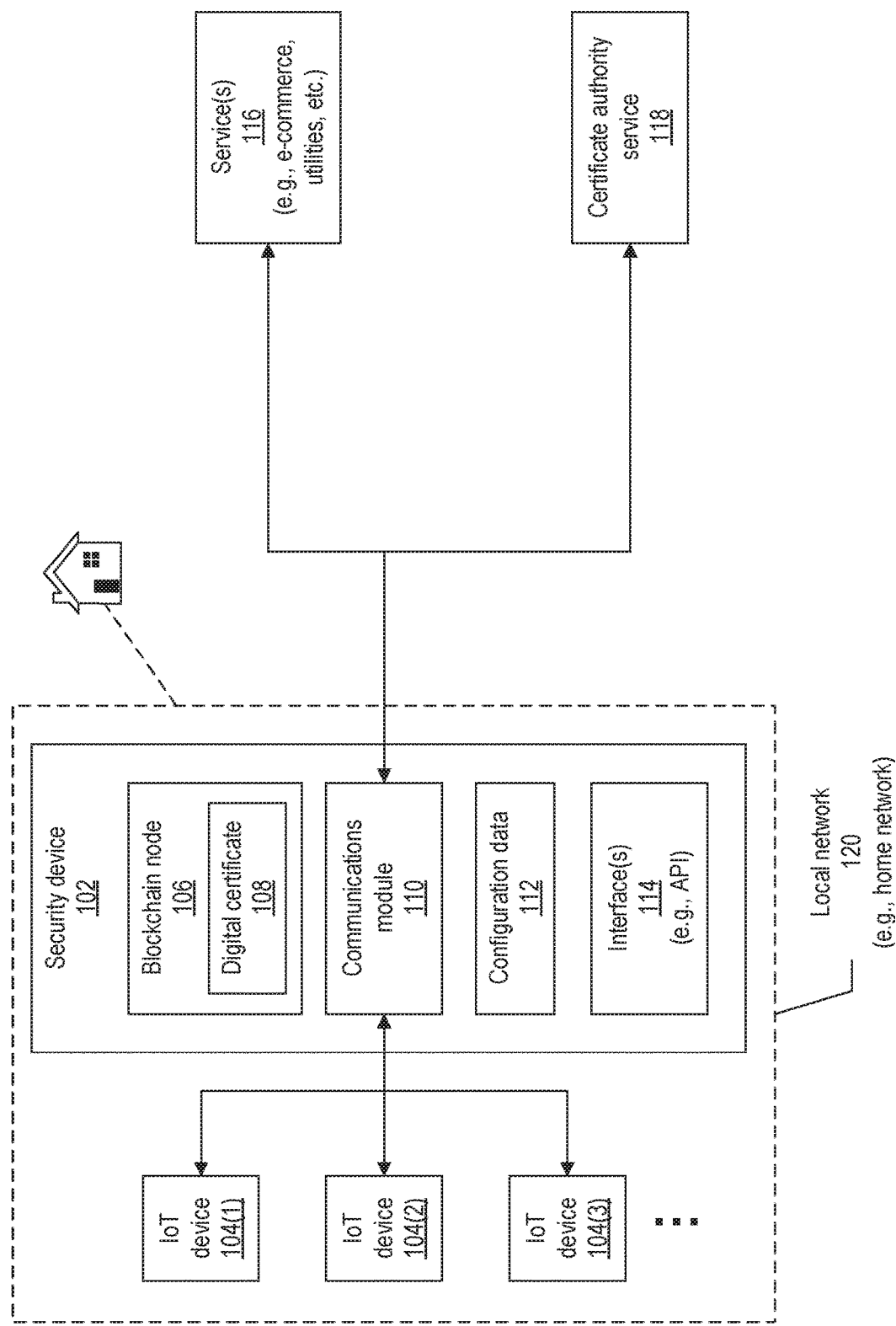
FIGS. 1A-1C depict example systems for network management, according to implementations of the present disclosure.

Implementations of the present disclosure are directed to systems, devices, methods, and computer-readable media for managing a network through use of a security device that includes, or has access to, a blockchain node. In some implementations, a security device is configured to manage a network of Internet-of-Things (IoT) devices in a home or other environment. The security device may act as an intermediary to manage communications between the IoT device(s) and external service(s), and/or the security device may establish trusted, secure communications with external services on behalf of the IoT device(s). The security device may also provide network security features such as a network firewall. In some implementations, the security device may run a blockchain node, and the blockchain could be used to establish a verifiable home identity. The home, e.g., through the security device, could interact with external resources and/or services, such as utility services, e-commerce services, and so forth, through this secure mechanism. For example, the security device may monitor the status various IoT device(s) that consume or distribute power, water, gas, and/or other resources in a home. The security device may detect a (e.g., power) failure or other issue and automatically communicate with a utility company to inform the company of the failure or other issue. The security device may provide secure and/or trusted communications with external services (e.g., external to the home network). In some instances, such communications may be performed automatically by the security device without requiring the intervention of a user.

In some implementations, multiple homes or other structures in an area (e.g., city, region, subdivision, neighborhood, etc.) may each include a security device, and the security devices may communicate with one another to aggregate data regarding the status and/or operations of systems within the homes. For example, in response to a water service outage in one home, a security device may communicate with other security devices in other homes to determine whether the outage is specific to the particular home or is present across a wider area including multiple homes. In some implementations, artificial intelligence (AI) is used to manage resources across multiple homes. For example, if a certain proportion of homes in an area are currently uninhabited (e.g., if the occupants are on vacation or the homes are unowned), utility services and/or other resources may be directed to the occupied homes and diverted from the unoccupied homes. In some implementations, the security devices of various homes may coordinate with one another to optimally distribute resources based on occupancy, usage patterns, and/or other criteria. Each security device may include a blockchain node, and the data regarding occupancy, service usage, and/or other current status of the various homes may be stored on the blockchain. Through the secure nature of the blockchain, the status information for the homes may be secured against unauthorized access. For example, the security device may have access to data regarding the current occupancy of the homes, the data stored on the blockchain, but the residents of the homes may not have access to the data or may have access to data that has been obfuscated to hide the particular details regarding which homes are empty. Accordingly, the security devices may be able to access data regarding other homes, and collectively make decisions regarding resource allocation, but individual users may not be able to access such data.

As another example, the security devices of multiple homes may share data regarding surveillance cameras, alarm systems, break-ins, attempted break-ins, and so forth, and the security devices in a neighborhood may automatically perform actions when a security risk is detected for one home. Such actions may include, checking whether doors are locked, locking unlocked doors, activating security cameras, turning on outdoor or indoor lights, notifying occupants, and so forth. In this way, implementations may provide for a smart, automated neighborhood watch system that may take actions automatically without requiring human intervention. Such a system would effectively merge and integrate the individual security systems of multiple homes to provide a neighborhood-wide, integrated security system.

In some implementations, a particular security device (e.g., in a particular home) may provide other security devices (e.g., in other homes) limited access to data regarding the managed home network. For example, a security device may provide utility status information to other security devices, but may not indicate when its home is occupied or not occupied. In some instances, the data exposed may be for a limited time period.

In some implementations, the security device may, using the blockchain, operate as a pseudo certificate authority (CA) (certificate authority) and/or intermediate CA with respect to the IoT devices on the network managed by the security device. For example, the security device may be the one device on a local (e.g., home) network that has been issued, and has stored, a digital certificate that is signed and recognized by a certificate authority. The certificate may be provided by the certificate authority for verifying the identity of the security device and/or for securing communications between the security device and other devices. In some instances, the certificate may include information about a cryptographic key, such as a public key used in a public key infrastructure (PKI) scheme for securing communication, e.g., in Transport Layer Security (TLS) communications.

In some implementations, the security device interacts with each of the individual IoT devices, e.g., as each is brought online and added to the network. The security device may determine, for each IoT device, whether that device is a trusted and/or secure device such that the device may be added to the network. For example, the IoT device may authenticate itself with the security device, and the security device may establish a command-and-control relationship with the IoT device. Through use of the certificate stored on the blockchain, the security device can ensure that communication between any trusted IoT device on the local network and external service(s) is secure, based on the trust determined for the IoT device. Accordingly, implementations provide and/or enhance the security and trust of an IoT ecosystem, such as a home network. A set of trusted IoT devices in the home may be used to assign a trust level for the connected devices. For example, because a particular IoT device may communicate with external services through the security device, the particular IoT device may not be required to individually authenticate itself to the external service. The security device may broker and/or mediate the trust relationship between the IoT device(s) and the external service(s), given that the external service(s) have confidence that the IoT device is on the local network that is managed by the security device and in the presence of other trusted devices. The security device may also be used for (e.g., Layer 2 and/or Layer 3) authentication for communication between IoT devices in a home, e.g., over a Local Area Network (LAN) or Personal Area Network (PAN), using protocols such as Z-Wave™, ZigBee™, Bluetooth Low Energy™ (BLE), and/or other suitable protocol(s). The security device may also be used to facilitate intuitive network segmentation without requiring the manual setup of separate networks, Virtual LANs, and so forth.

In some implementations, the security device may store or have access to configuration data listing the IoT devices that are on the local network (e.g., in the home). The security device may know that the IoT devices are trusted. Based on the trust levels of the individual IoT devices, an overall trust level may be assigned to the local network (e.g., to the home) as a whole. Given the overall trust level for the local network, adding a new device to the network may incur less risk than in traditional systems, given that the new device is being added into an already trusted environment. Through use of the certificate stored (e.g., on the blockchain) on the security device, the security device may interact with the IoT devices and mediate the trust relationship between IoT devices and outside world. In this way, IoT devices that do not have certificates and/or lack a capability to use certificates can have trust relationship with external service(s), using the security device as a trust mediator. The security device may store the certificate for managing trust, and the other IoT devices may communicate with external service(s) through the security device.

In some implementations, the security device may store the blockchain, e.g., operate a blockchain node. In some implementations, the security device may access a blockchain stored elsewhere, and the security device may have an account and/or access credentials to be used for accessing data on the blockchain. The blockchain may provide secure access to data that is stored immutably.

In some implementations, the security device may operate as a payment and/or transaction hub or gateway for the IoT devices, such that transactions between the IoT devices and external service(s) go through the security device. For example, a payment component may be executing on the security device and/or the security device may store payment information for a payment instrument such as a credit card. The IoT device may request a particular payment be provided to an external service by the security device. Payment information may be securely stored on the blockchain. For example, an IoT device may be a lamp or light fixture, or a sensor module that monitors the lamp or light fixture. The IoT device may detect that the bulb in the lamp has burned out, and the IoT device may send a message to the security device to request that the security device use the payment information to purchase a new replacement bulb from an online retailer. In some instances, such purchases may be performed automatically without requiring user intervention, e.g., after an authorized user has initially set up the payment information and authorized the security device to automatically perform such transactions.

In some implementations, the security device may expose an interface. The interface may be a user interface, such as a web interface or other graphical user interface (GUI). The interface may also be an application programming interface (API) that enables other processes to securely interact with the security device. Such an interface may enable security devices to interact with one another to share information, make aggregate decisions regarding resource allocation, security, and so forth, and/or perform other tasks. The interface may also enable the security device to interact with other devices that may be associated with an occupant of the home. For example, the home security device may interact over one or more networks with an onboard computer of the occupant's vehicle, a user device (e.g., tablet computer, smartphone, etc.), and so forth.

In some implementations, the security device may control one or more mechanisms of the home or other structure where the security device is managing a network. For example, the security device may interact over one or more (e.g., wired or wireless) networks with one or more lock mechanisms for doors in the home. When a service person (e.g., plumber, HVAC repair person, etc.) requires access to the home, the security device may broker access, provide payment to the service person, coordinate a real-time communication (e.g., video chat) session between the service person and the homeowner, and so forth. Access may be granted to the service person for a single instance or for a limited time period.

In some implementations, the security device may maintain a list (e.g., map) of the IoT devices present in the home, and that list may be used to confirm the identity and/or current location of a user or their user device (e.g., smartphone). Such confirmation may be used for fraud prevention, to authenticate the user, and/or for other purposes. For example, when a new IoT device is added to the home network, a service may require additional authenticate from the user to confirm that they are who they purport to be, given the change in their current environment. Moreover, the security device may confirm a user's location in the home based on sensor data and/or the current network presence of the user device (e.g., smartphone), as an additional check that the user is who they claim to be during authentication.

A blockchain, which may also be referred to as a distributed ledger, is a (e.g., public) ledger of all transactions that have been executed in one or more contexts (e.g., negotiable instrument transactions, digital currency transactions, etc.). A blockchain may grow as completed blocks are added with a new set of transactions. In some examples, a single block is provided from multiple transactions (e.g., multiple deposits of different checks by different people). In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions (e.g., deposits of checks). Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all entities on the blockchain network may need to know all previous transactions (e.g., deposits, withdrawals, etc.) to validate a requested transaction, all entities must agree on which transactions have actually occurred, and in which order. For example, if two entities observe different transaction histories, they will be unable to come to the same conclusion regarding the validity of a transaction. The blockchain enables all entities to come to an agreement as to transactions that have already occurred, and in which order. In short, and as described in further detail below, a ledger of transactions is agreed to based on the amount of work required to add a transaction to the ledger of transactions (e.g., add a block to the blockchain). In this context, the work is a task that is difficult for any single node (e.g., computing device) in the peer-to-peer network to quickly complete, but is relatively easy for a node (e.g., computing device) to verify.

The peer-to-peer network includes so-called miners (e.g., computing devices) that add blocks to a blockchain based on the blockchain protocol. In general, multiple miners validate transactions that are to be added to a block, and compete (e.g., perform work, as introduced above) to have their block added to the blockchain. Validation of transactions includes verifying digital signatures associated with respective transactions. For a block to be added to the blockchain, a miner must demonstrate a proof of work before their proposed block of transactions is accepted by the peer-to-peer network, and is added to the blockchain. A blockchain protocol includes a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value, in that the hash value cannot be 'un-hashed' to determine what the input was. The blockchain protocol can require multiple pieces of information as input to the CHF. For example, the input to the CHF can include a reference to the previous (most recent) block in the blockchain, details of the transaction(s) that are to be included in the to be created block, and a nonce value (e.g., a random number used only once).

Multiple nodes may compete to hash a set of transactions and provide the next block that is to be added to the blockchain. The blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain. Each miner provides the reference to the previous (most recent) block in the blockchain, details of the transaction(s) that are to be included in the to-be-created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain. Consequently, the respective miner's block is broadcast across the peer-to-peer network. All other miners cease work (because one miner was already successful), and all copies of the blockchain are updated across the peer-to-peer network to append the block to the blockchain. Each miner may be required to produce hundreds or thousands of hash values, before any one miner provides a qualifying hash value (e.g., at least the first four characters of the hash value are each zero).

In some cases, the distributed ledger or blockchain system can include one or more sidechains. A sidechain can be described as a blockchain that validates data from other blockchains. In some examples, a sidechain enables ledger assets (e.g., a digital currency) to be transferred between multiple blockchains.

The IoT devices may include, but are not limited to, one or more of the following: smart appliances (e.g., washers, dryers, refrigerators, ovens, dishwashers); home entertainment systems (e.g., televisions, audio systems, game consoles, media players, etc.); in-home control systems (e.g., garage door openers, alarm systems, security systems, smart home systems); lighting devices (e.g., lamps, fixtures, etc.); utility systems that provide and/or control electric power, gas, water, sewage, heating and air conditioning, network access, and so forth, (e.g., water meters, water heaters, gas meters, electrical switch boxes, circuit breaker boxes, etc.); and/or portable or less portable computing devices (e.g., smartphones, tablet computers, electronic book readers, gaming systems, laptop computers, desktop computers, television set-top boxes, in-vehicle automotive computers or telematics devices, etc.). In some instances, the IoT devices may be in the home or other building, and/or outside the building but in a same property lot as the building. In some instances, the IoT devices may be external to the building and sufficiently proximal to the building such that the data 106 generated by the data generating device 104 indicates a status of the building. For example, an IoT device may be a power distribution device located on a utility box, switch box, or other location external to the building and its lot, but indicating a level of electrical power being consumed by and/or supplied to devices in the building or on the lot.

Figure 1B:
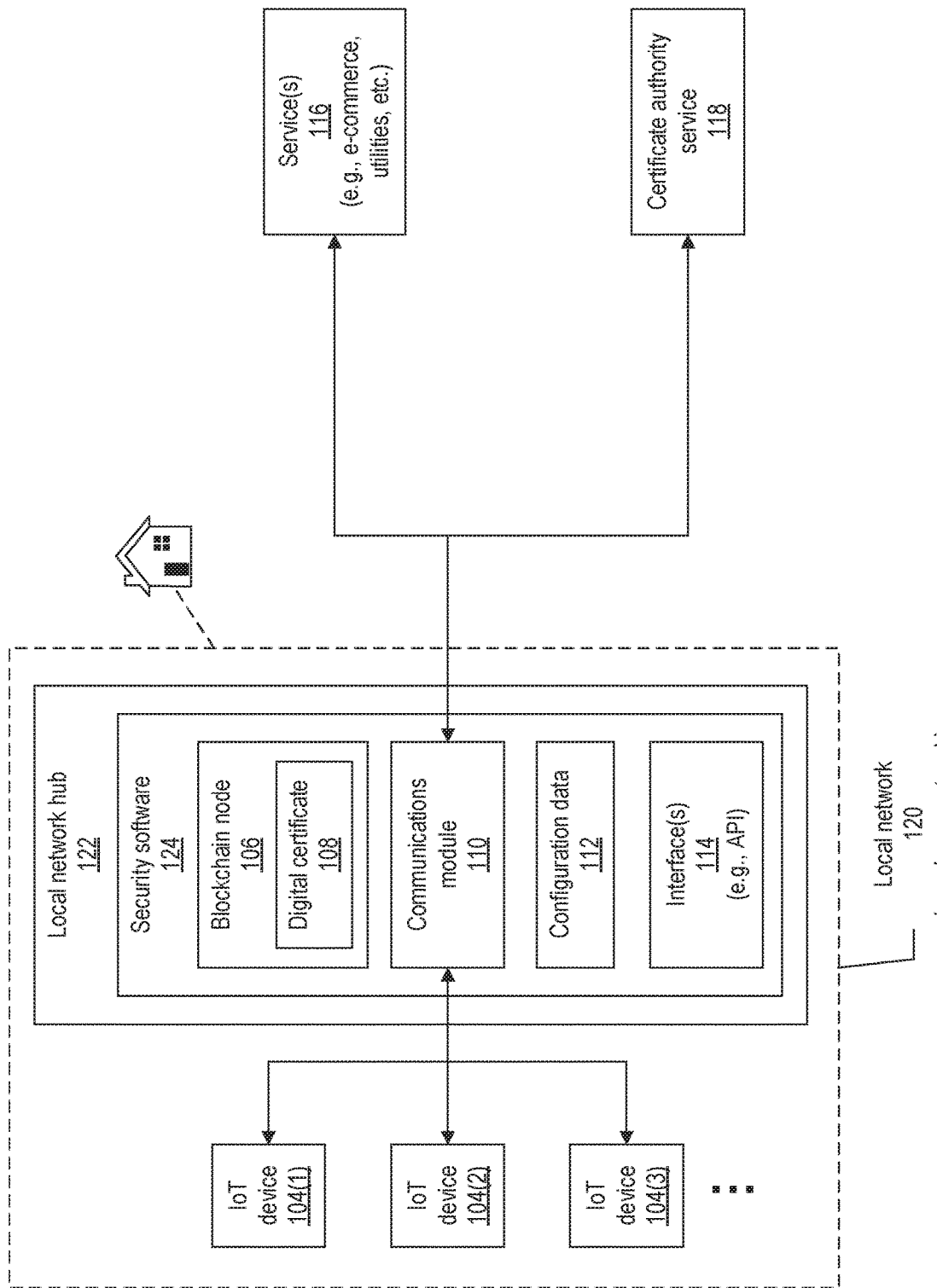
Figure 1C:
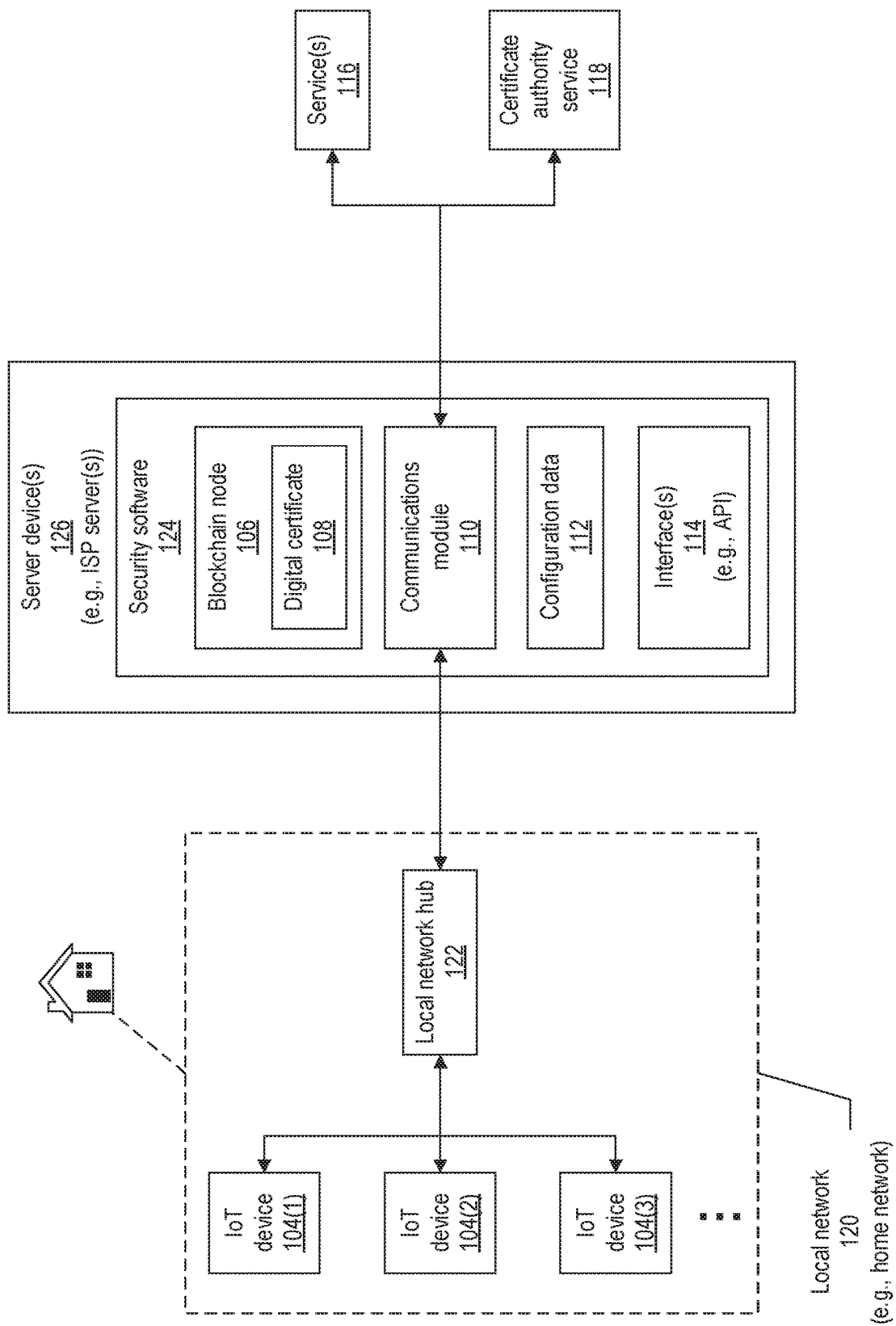

FIGS. 1A-1C depicts example systems for network management, according to implementations of the present disclosure. As shown in the example of FIG. 1A, the system may include a security device 102 as described above, the security device 102 configured to manage and/or mediate trust/security for one or more IoT devices 104 on a local (e.g., home) network 120. The local network 120 may include IoT devices 104 that are situated in or proximal to a structure such as a house. The security device 102 may execute a blockchain node 106. As described above, the blockchain node 106 may store a digital certificate 108 that has been issued to the security device 102 by a certificate authority service 118. In some instances, the blockchain node 106 may be external to the security device 102, and the various software module(s) of the security device 102 may access the blockchain over one or more networks using credentials and/or an account of the security device 102. The security device 102 may execute a communications module 110 that mediates communicates between the IoT device(s) 104 and one or more external service(s) 116 (e.g., e-commerce services, utility services, etc.) as described above. The security device 102 may store configuration data 112 that describes the various IoT device(s) currently on the network 120. The configuration data 112 may also be stored externally to the security device 102 and may be accessible over one or more networks. The security device 102 may execute one or more interface(s) 114, such as a GUI web interface or other user interface, or API(s) as described above.

In the example of FIG. 1A, the security device 102 is a configured to perform the security and access control operations described herein with respect to IoT device(s) 104. Accordingly, in some instances the security device 102 may be described as a dedicated security device that is particularly provisioned and/or configured to perform such operations. For example, the security device 102 may be a home firewall device that secures a home network from intrusion by potentially malicious outside entities or processes. This functionality can also alert the homeowner or other individual of any breach of the home either electronically or physically, by sending an alert notification to the individual's mobile device (or other computing device) in real time with respect to detection of the breach. In some environments, this can reduce or eliminate the need for security monitoring systems that are able to detect a breach but are unable to take action without law enforcement involvement.

In the example of FIG. 1B, a local network hub 122 is on the local network 120, and may be physically located in the home environment. The hub 122 may include any suitable number and type of computing device(s). In some implementations, the hub 122 performs roles other than the IoT security and access control operations described herein, and may be provisioned to execute security software 124 that manages security and/or access control for the IoT device(s) 104. For example, the security software 124 may perform similar operations to those described with respect to the security device 102. In some implementations, the hub 122 may be a local network hub 122 that is provided by an internet service provider (ISP), and that may provide network connectivity along with other products such as entertainment, video and/or audio content streaming and/or playback, gaming, social networking, and so forth. The security software 124 may be provisioned onto (e.g., downloaded to) the hub 122 and execute on the hub 122 to provide the access control and security features for the IoT device(s) 104, as described herein. The security software 124 may be periodically updated to add features, address bugs, and so forth. The security software 124 may mediate communications between the IoT device(s) 104 and external service(s) 116 as described herein.

In some implementations, as shown in the example of FIG. 1C, the security software executes outside the local network, on one or more server device(s) 126 that are remote from the local network and that communicate with the local network over the internet and/or other wide area network(s). In such instances, a local network hub 122 may operate within the local network to forward communications between the IoT device(s) and the server device(s) 126, and the security software 124 executing on the server device(s) 126 performs operations, as described herein. to provide secure communications between the IoT device(s) 104 and external service(s) 116, and/or to control access to the IoT device(s) 104 from external entities. In some examples, the security software 124 executes on server device(s) 126 operated and maintained by an ISP that provides network services and/or other services to the home. In such instances, the ISP may offer an additional service to secure and control access to the home IoT device(s) 104 as described herein.

Accordingly, as shown in FIGS. 1A-1C, the operations to manage a network of IoT devices, broker a trust relationship, and/or provides secure, trusted communications between the IoT device(s) and external services may be performed locally by a (e.g., dedicated) security device 102 and/or by security software 124 that executes on a more general purpose hub 122 situated locally. Alternatively, the operations may be performed externally to the local network, on server device(s) 126 (e.g., ISP server(s)) that execute security software 124. Moreover, implementations also support hybrid solutions in which the operations are performed by a combination of hardware and software elements that operate on the local network and/or remotely from the local network. In each configuration, the security platform (e.g., security device and/or security software) interacts with IoT device(s) 104 that are provided by various manufacturers, and that may support different communications protocols and/or data formats. The security platform provides an interface that different types of IoT device(s) 104 can call into. Accordingly, the IoT device(s) 104 may be configured to communicate with the platform.

Although examples herein may describe the IoT device(s) as in-home device(s), implementations are not so limited. The IoT device(s) 104 can also include device(s) that are outside the home and/or capable of operating outside the home, such as in-vehicle computers, portable personal computing device(s) (e.g., smartphones, tablet computers, wearable computers, etc.), outdoor control devices for controlling irrigation systems, lighting, and so forth, and/or other types of device(s). Such device(s) may communicate wireless with the platform and/or other device(s), and may encompass a broader network of device(s) that is not limited to in-home device(s).

In some implementations, one or more of the IoT device(s) 104 may be configured to receive power wirelessly, through a signal that is broadcast by a beacon in proximity to the IoT device(s) 104. The IoT device(s) 104 so configured may receive the signal and, using a wireless transceiver that is so configured for power conversion, divert at least some of the power of the signal to use for powering operations of the IoT device and/or charging a battery of the IoT device. Accordingly, the IoT device(s) 104 may be charged and/or powered automatically when in proximity to the beacon, even when other sources of power are not available. In some implementations, the security device 102 and/or the hub 122 may operate as the beacon to transmit the power-conveying signal. Alternatively, the signal may be transmitted from some other beacon device that is in proximity to the IoT device(s) 104 being powered via the signal.

Figure 2:
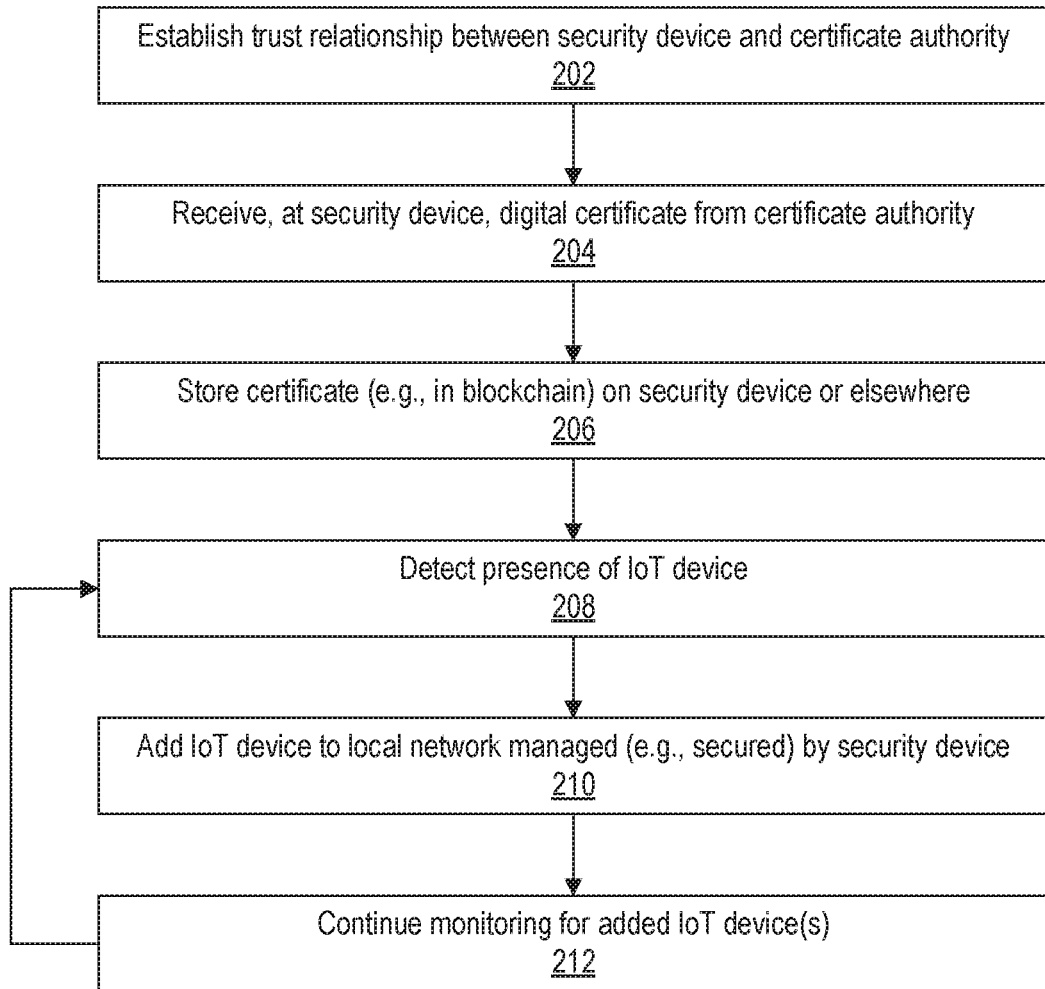
FIG. 2 depicts a flow diagram of an example process for establishing a network, according to implementations of the present disclosure.

FIG. 2 depicts a flow diagram of an example process for establishing a network, according to implementations of the present disclosure. Operations of the process may be performed by one or more of the communications module 110, the interface(s) 114, the service(s) 116, the certificate authority service 118, the security software 124, and/or other software module(s) executing on the security device 102, IoT device(s) 104, the server device(s) 126, or elsewhere.

A trust relationship may be established (202) between the security device 102 and a certificate authority service 118. Such a relationship may be established based on credentials provided by the security device 102 to the service 118, and/or through other mechanism.

Based on the successful establishment of the trust relationship, the certificate authority service 118 may provide the security device 102 with a digital certificate 108. The digital certificate 108 may be received (204) by the security device 102.

The digital certificate 108 may be stored (206) on the security device 102 or elsewhere. As described above, in some implementations the digital certificate 108 may be stored on a blockchain that is on the security device 102 or accessible by the security device 102.

The security device 102 may detect (208) the presence of an IoT device 104 to be added to the network 120. The IoT device 104 may authenticate itself to the security device 102, and/or establish its own trust relationship with the security device 102, using any suitable protocol.

The IoT device 104 may be added (210) to the network 120 that is secured and/or managed by the security device 102. This may include adding a description of the IoT device 102 to the configuration data 112 for the network 120. The security device 102 may continue monitoring (212) for new IoT devices to be added to the network 120, while managing communications between the IoT device(s) 104 and external services as described with reference to FIG. 3.

Figure 3:
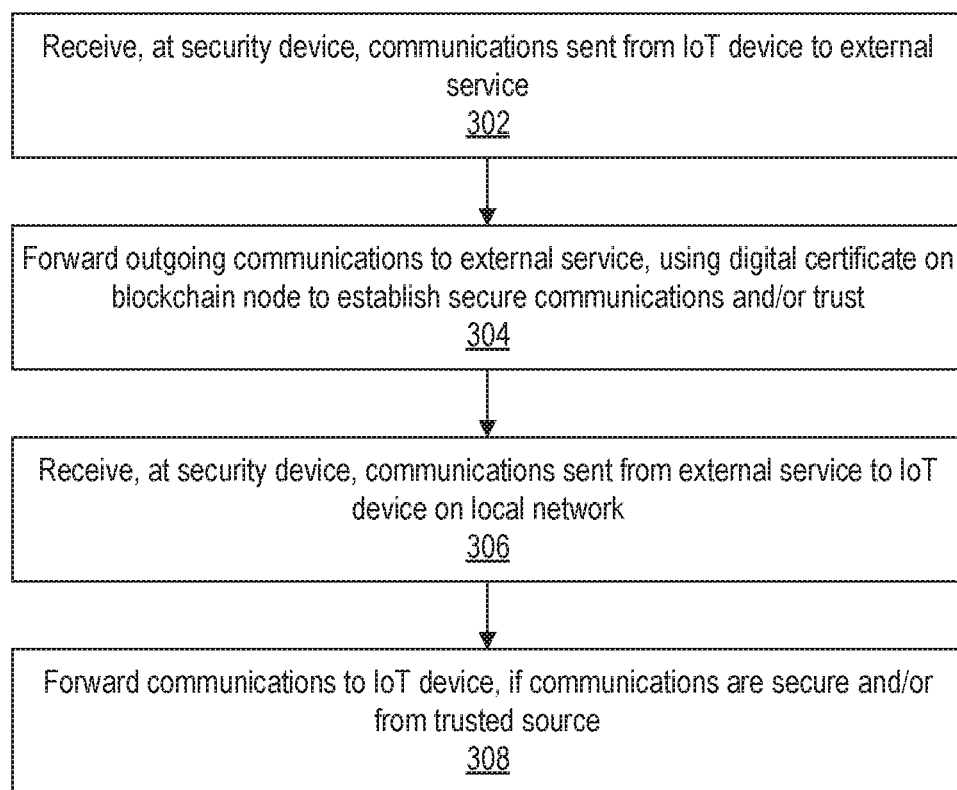
FIG. 3 depicts a flow diagram of an example process for network management, according to implementations of the present disclosure.

FIG. 3 depicts a flow diagram of an example process for network management, according to implementations of the present disclosure. Operations of the process may be performed by one or more of the communications module 110, the interface(s) 114, the service(s) 116, the certificate authority service 118, the security software 124, and/or other software module(s) executing on the security device 102, IoT device(s) 104, the server device(s) 126, or elsewhere.

The security device 102 may receive (302) communication(s) sent from an IoT device 104 on the local network 120 toward an external service 116. In some implementations, the security device 102 may intercept outgoing communications that are addressed to the external service. In some implementations, the communications may be addressed to the security device 102, e.g., as a network appliance, to be forwarded to the external service.

The security device 102 may forward (304) the outgoing communication(s) to the intended recipient external service, using the digital certificate 108 to establish secure communications and/or trust with the external service.

The security device 102 may receive (306) incoming communications from the external service, e.g., sent to an IoT device 104 on the network 120.

The security device 102 may forward (308) the communications to the IoT device 104 if the security device 102 determines that the communications are secure and/or that the sender is a trusted entity. The security and/or trust determination may be based on the digital certificate used to establish a secure connection and/or trust relationship between the security device 102 and the external service sending the communications.

Implementations provide a secure solution to allow a user to manage their smart home and/or connected vehicle environment, as well as other types of IoT device(s) within the home or elsewhere. The platform (e.g., the security device and/or security software described herein) can provide support for the user during a catastrophic event, such as a weather event, earthquake, fire, flood, and so forth. In such events, the platform may receive information collected by the user's IoT network, regarding damage to the user's home, environs, and/or devices within the home. Such information may be analyzed and used to trigger various actions related to repairs, insurance claims, calling for emergency assistance (e.g., police, fire, medical services, etc.), and so forth. The platform can also provide support for the user during more typical, daily interactions. For example, data collected from IoT device(s) can be analyzed to determine affordable, simplified, and/or customizable insurance coverage options for the user, as well as identifying repairs and/or maintenance actions that can be taken regarding the user's home, environs, and/or device(s) therein.

In some implementations, the user may interface with the platform to view and manage their IoT device(s), using a smartphone or other user device. The platform may allow the user access to view and/or manage IoT device(s) based on a successful authentication of the user. Authentication may be by way of credentials provided by the user, such as a username, password, personal identification number (PIN), answers to knowledge-based questions (e.g., What is your mother's maiden name?), and so forth. Authentication may also be based on biometric data collected from the user, such as the user's fingerprint, gait, retinal scan, voice print, facial image recognition, heartbeat, pulse, neural activity (e.g., brain waves), galvanic skin response, and so forth.

A secure IoT ecosystem, as described above, may include a secure hub that is present in the home and on the local home network. The secure hub may be the hub 122 and/or the security device 102 described above. The secure hub provides network vulnerability detection and prevention, attack notifications, data analysis and learning, and/or parental control flexibility for controlling access to information and/or device(s). The secure hub may interact with various IoT device(s) in the environment, such as thermostats, cameras, other security device(s), a voice-activated personal assistant device, garage door, door locks, water system sensor, and so forth. The platform (e.g., the security device 102 and/or security software 122 described above) provides an IoT solution for IoT network connectivity, endpoint network security, command/control orchestration for IoT device(s), secured interactions with IoT device(s), and/or fine-grained IoT access control. The platform may also employ a blockchain for secure, immutable information storage, to store data regarding the IoT management and access control operations. An application (e.g., app) running on the user's smartphone and/or other mobile device provides a user experience for viewing and/or managing the user's IoT, based on secure (e.g., biometric) authentication of the user.

The platform provides a command/control orchestration layer for command and control of IoT devices. In some implementations, as in the example of FIG. 1C, the platform provides a distributed (e.g., cloud-based) solution that allows for a fine-grained access control mechanism to manage, command, and/or control IoT device(s) and enable access management. In some implementations, the orchestration layer includes a mobile application with biometric-based identity management and/or authentication, device identity, access, and command validation for IoT devices, and end-point network security. The platform has the ability to integrate with various mobile apps, IoT device(s), and secure hubs, and participate in end-to-end IoT security and access control. The platform can provide a centralized repository for IoT device data and event management. The platform can also include advanced analytics and modeling. Unlike most traditional platforms and/or infrastructure that are corporate-owned, implementations provide a security infrastructure in which the consumer owns the actions performed by, and the data generated by, the IoT devices, which they could monetize individually or in a summarized format. The platform provides real-time data access, streaming data analytics, and event monitoring. The platform may also interface with other third party services to receive current information regarding weather conditions, traffic, and so forth. Accelerator(s) may provide access to additional data and/or features to be consumed by the platform.

The platform may be configured to interface with IoT device(s) that are home-IoT ready, support cloud-based offerings, are API/SDK capable, are able to integrate with existing IoT platforms, hubs, and home networks, and/or are data ingestion capable for tracking, analyzing, and modeling data.

Figure 4:
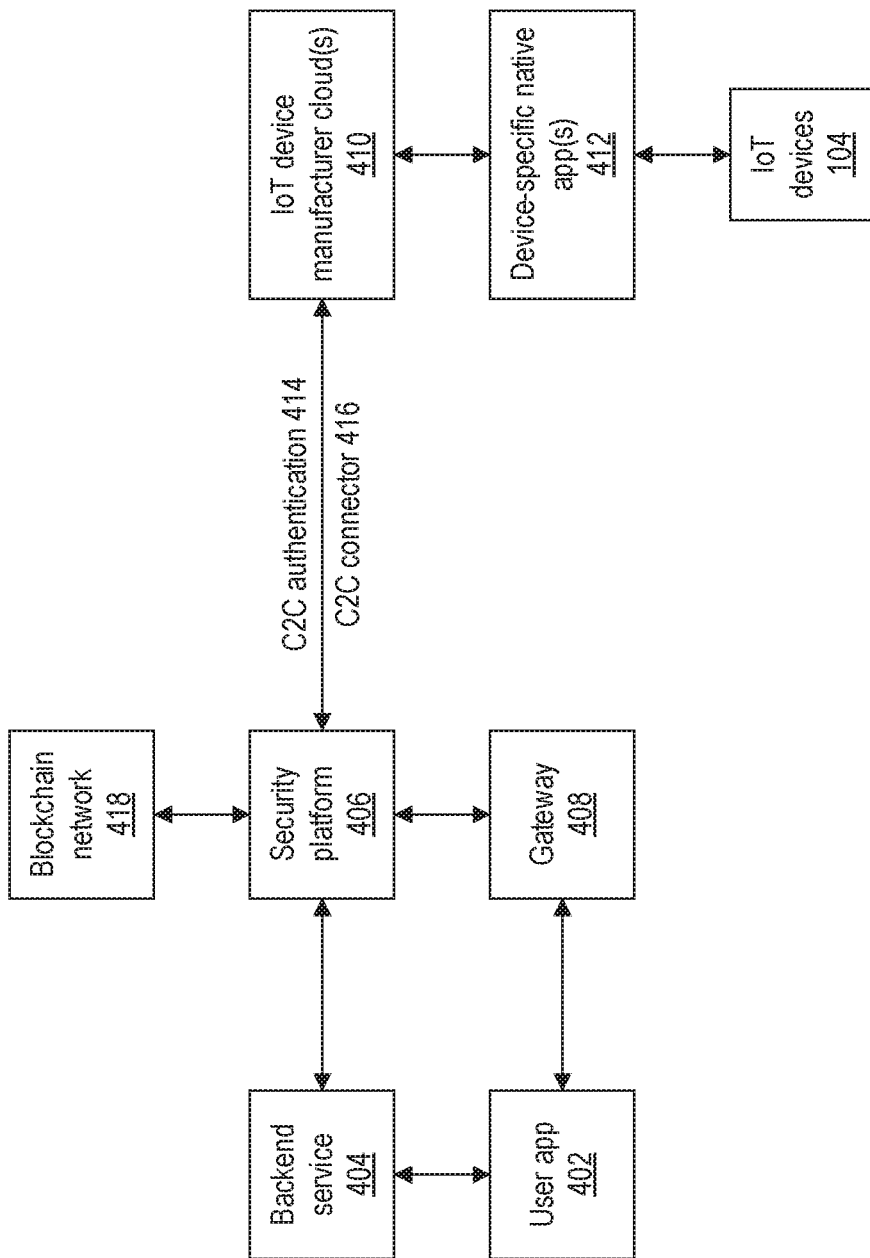
FIG. 4 depicts an example system for network management, according to implementations of the present disclosure.

FIG. 4 depicts an example system for network management, according to implementations of the present disclosure. A user application (app) 402 executes on a user device. The user device can be any suitable type of computing device, including a portable computing device (e.g., smartphone, tablet computer, wearable computing device, etc.) or a less portable type of computing device (e.g., laptop computer, desktop computer, etc.). In some implementations, the user app 402 is a client application provides by a financial services organization, and the user app 402 can provide a user with access to financial account information and/or other services. The user app 402 communicates with a backend service 404 that may be provided by the same organization that provides the user app 402. The security platform 406 includes the security device 102 and/or security software 124 described herein. The system can also include a gateway 408, such as a WiFi or other type of network gateway in a home environment or other environment. The user app 402 and/or security platform 406 may communicate with the backend service 404 and/or other component(s) via the gateway 408.

The security platform 406 may access and/or be a part of a blockchain network 418, as described above. The blockchain network 418 may store information regarding IoT device(s), their configuration, permissions to access external service(s), and/or a digital certificate to provide secure communications between IoT device(s) and other service(s).

The platform 406 may employ (cloud-to-cloud) C2C authentication 414 and C2C connector 416 to interact with cloud(s) 410 associated with the IoT device manufacturers. The cloud(s) 410 may interface with IoT device-specific native app(s) 412 executing on the user device (e.g., the same user device running the user app 402, or a different user device). The native app(s) 412 may interact with the various IoT device(s) 104.

Figure 5:
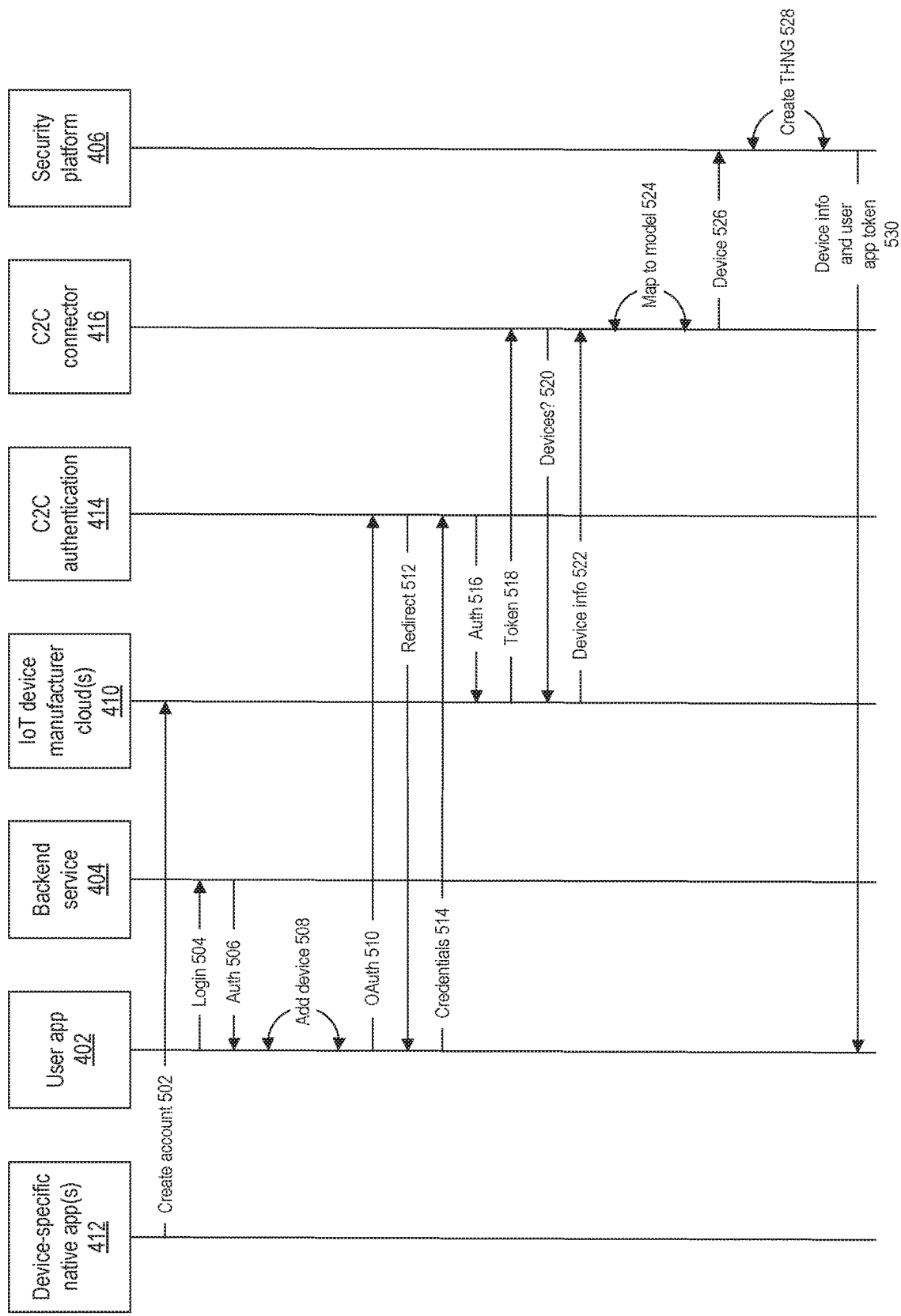
FIG. 5 depicts a flow diagram of an example process for device registration and linking, according to implementations of the present disclosure.

FIG. 5 depicts a flow diagram of an example process for device registration and linking, according to implementations of the present disclosure. Operations of the process may be executed by one or more of the user app 402, the backend service 404, the security platform 406, the cloud(s) 410, the native app(s) 412, the C2C authentication 414, and/or the C2C connector 416.

A native app 412 may create an account (502) with the appropriate cloud 410, the account used for managing operations of one of the IoT device(s).

The user app 402 may be used to login (504) to the backend service 404 using one or more credentials, which may include biometric data as described above. On successful login and validation of the credentials, the backend service 404 may provide (506) an authorization (e.g., a token) to the user app 402 for storage on the user device. The user app 402 may add (508) an IoT device for management through the user app.

The user app 402 may send (510) an OAuth (Open Authorization) request to the C2C authentication 414, which may respond (512) with a redirect message. The user app 402 may send (514) its credentials to the C2C authentication 414, which authenticates based on the credentials and sends (516) an authorization message to the appropriate cloud 410 for the IoT device being registered. The cloud 410 sends (518) a token to the C2C connector 416, and the connector may query (520) the cloud 410 for a list of devices managed through the cloud. The cloud can respond (522) with the device info for the managed IoT devices.

The C2C connector 416 maps (524) the device info to a model, and sends (526) the device info to the security platform 406. The platform 406 creates (528) a THNG, and sends (530) the device info and a user app token to the user app 402.

Figure 6:
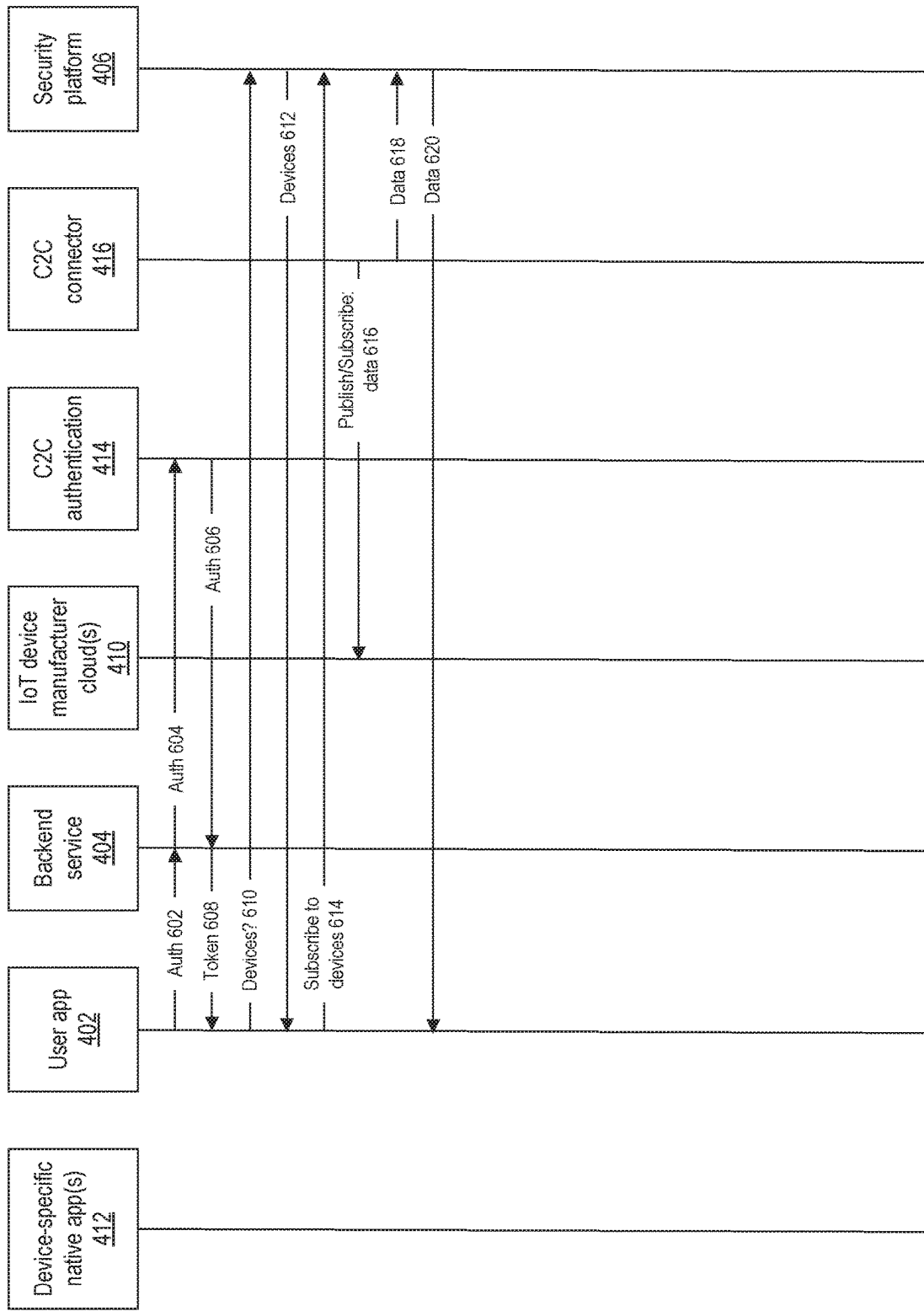
FIG. 6 depicts a flow diagram of an example process for determining device properties, according to implementations of the present disclosure.

FIG. 6 depicts a flow diagram of an example process for determining device properties, according to implementations of the present disclosure. Operations of the process may be executed by one or more of the user app 402, the backend service 404, the security platform 406, the cloud(s) 410, the native app(s) 412, the C2C authentication 414, and/or the C2C connector 416.

The user app 402 requests (602) authorization through the backend service 404, which forwards (604) the authorization request on to the C2C authentication 414. The C2C authentication 414 responds (606) with an authorization determination to the backend service 404, which sends (608) the appropriate token to the user app 402. This initial authorization handshake may be performed prior to interactions of the user app with other components.

The user app 402 sends (610) a query for available devices to the security platform 406, with responds (612) with a list of the available devices. The user app 402 sends (614) a request to subscribe to one or more devices to the platform 406. The C2C connector 416 sends (616) publish/subscribe data to the cloud(s) 410 corresponding to the device(s). The C2C connector 416 also sends (618) data to the platform 406, which sends (620) the data to the user app 402.

Figure 7:
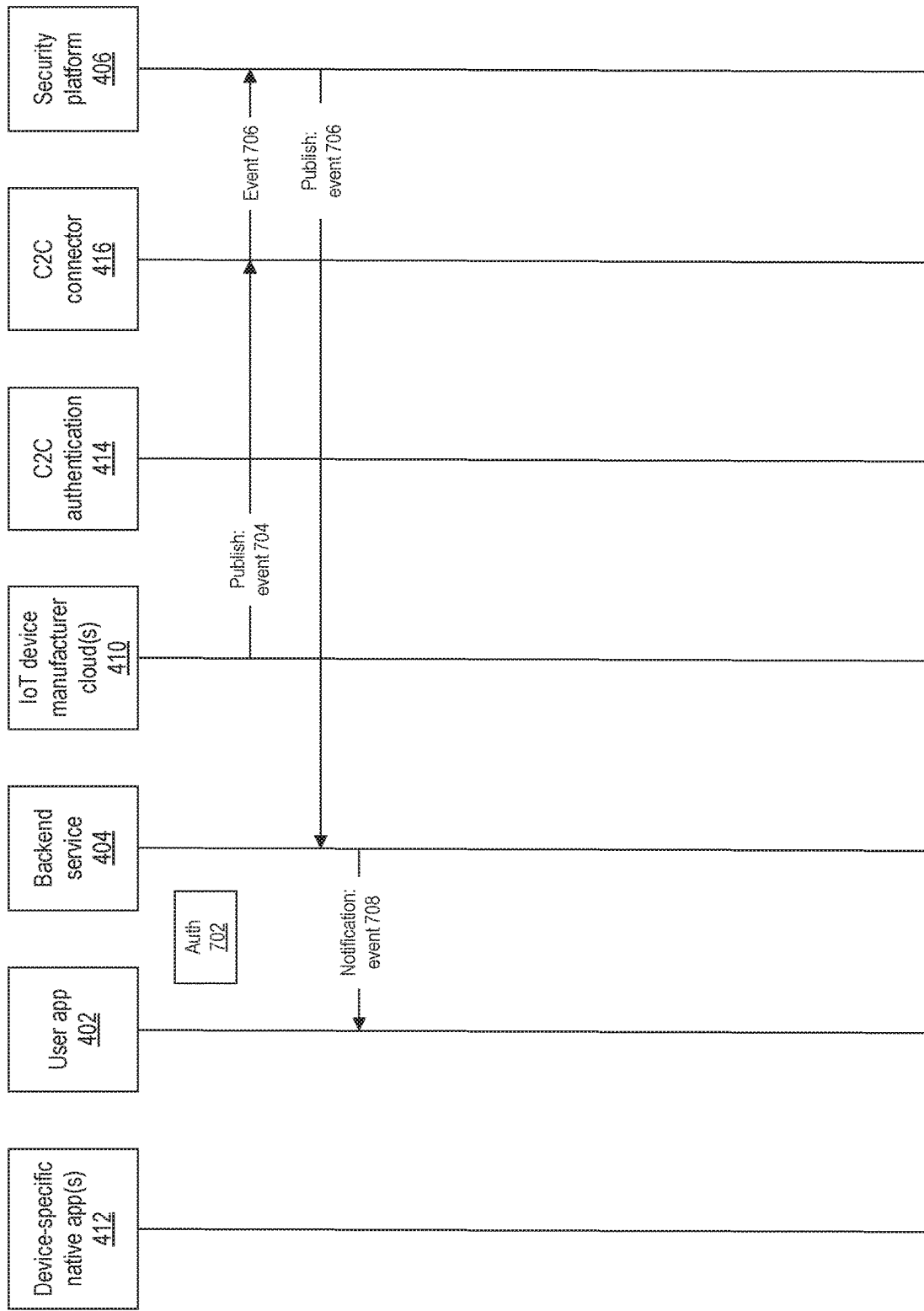
FIG. 7 depicts a flow diagram of an example process for providing notifications, according to implementations of the present disclosure.

FIG. 7 depicts a flow diagram of an example process for providing notifications, according to implementations of the present disclosure. Operations of the process may be executed by one or more of the user app 402, the backend service 404, the security platform 406, the cloud(s) 410, the native app(s) 412, the C2C authentication 414, and/or the C2C connector 416.

The authorization handshake can be performed (702) as described above. One of the cloud(s) 410 can publish (704) an event related to one of the IoT device(s) managed through the cloud. The event can be published to the C2C connector 416, which forwards (706) the event to the platform 406. The platform 406 publishes (706) the event to the backend service 404, which sends (708) a notification of the event to the user app 402.

Figure 8:
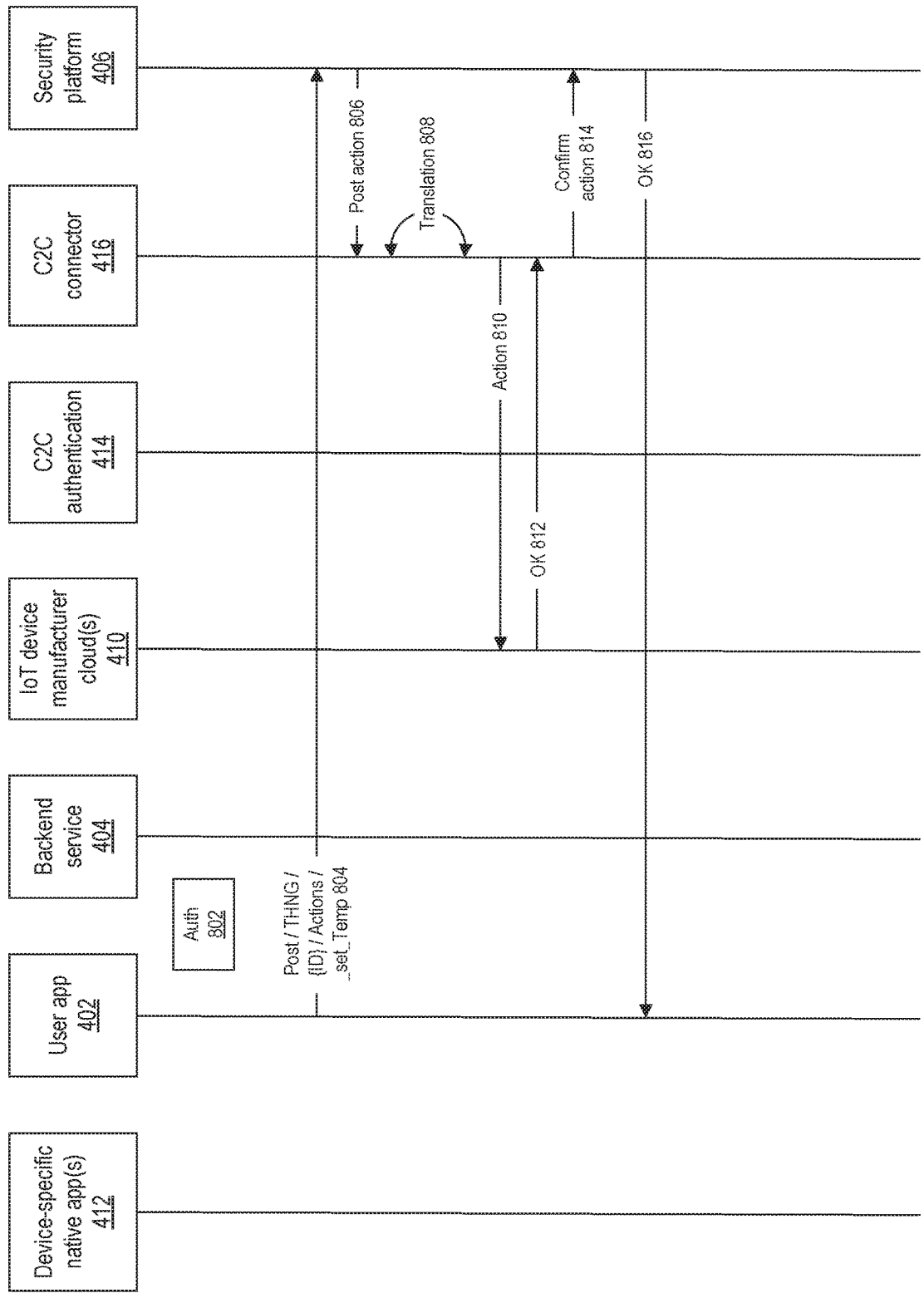
FIG. 8 depicts a flow diagram of an example process for device actuation, according to implementations of the present disclosure.

FIG. 8 depicts a flow diagram of an example process for device actuation, according to implementations of the present disclosure. Operations of the process may be executed by one or more of the user app 402, the backend service 404, the security platform 406, the cloud(s) 410, the native app(s) 412, the C2C authentication 414, and/or the C2C connector 416.

The authorization handshake can be performed (802) as described above. The user app 402 sends (804) a post message, indicating a THNG ID of, and actions to be performed by, an IoT device. The post message may be sent to the platform 406, which sends (806) the post action to the C2C connector 416. The C2C connector 416 performs (808) a translation, and sends (810) the action to the appropriate cloud 410. The cloud can cause the action(s) to be performed by the identified IoT device, and the cloud sends (812) an acknowledgement (e.g., OK) to the C2C connector 416, which confirms (814) the action(s) with the platform 406. The platform 406 may then send (816) an indication to the user app 402 to notify the user app that the action(s) have been performed.

Figure 9:
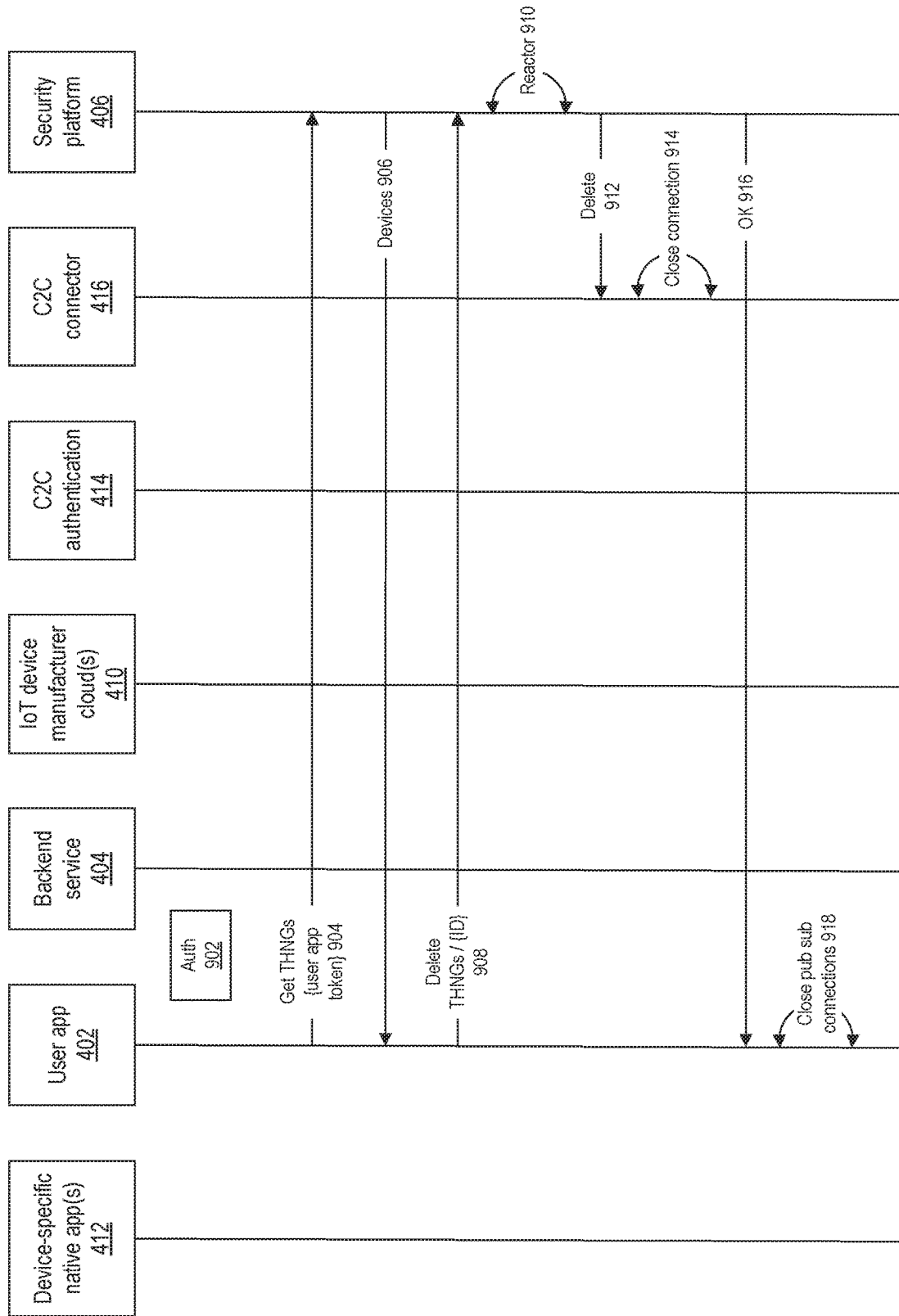
FIG. 9 depicts a flow diagram of an example process for removing a device from an account, according to implementations of the present disclosure.

FIG. 9 depicts a flow diagram of an example process for removing a device from an account, according to implementations of the present disclosure. Operations of the process may be executed by one or more of the user app 402, the backend service 404, the security platform 406, the cloud(s) 410, the native app(s) 412, the C2C authentication 414, and/or the C2C connector 416.

The authorization handshake can be performed (902) as described above. The user app 402 can send (904) a request to get THNGs to the platform 406. The platform 906 can respond (906) with a list of the device(s). The user app 402 can send (908) a request to delete one or more THNGs, identified by the appropriate ID(s), to the platform 406. The platform 406 performs (910) a reactor, and sends (912) a message to the C2C connector 416 indicating the device(s) to be deleted. The C2C connector closes (914) the connection for the device(s) to be deleted, and the platform 406 sends (916) a notification to the user app 402 indicating that the device(s) have been deleted from the account. The user app 402 can then close (918) the pub sub connections 918. Pub sub connections are events that are published (pub) or subscribed to (sub). Pubs are generated and subs are consumed, such that some messages can be generated by one device and consumed by another. For example, a refrigerator may send a message to a personal assistant device in the home, the message indicating that the homeowner needs more milk. In this example, the refrigerator publishes the message and the personal assistant device consumes it.

Figure 10:
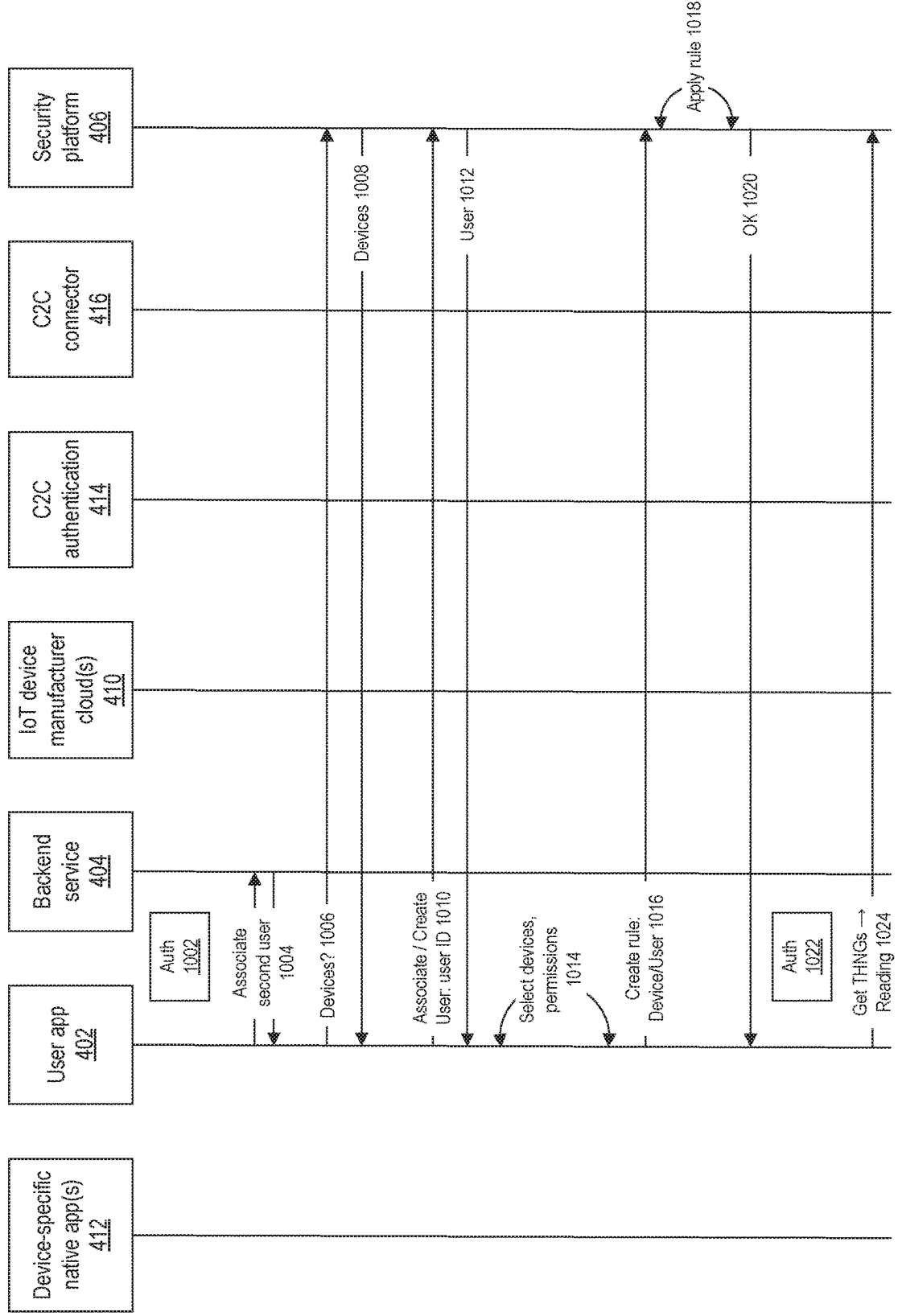
FIG. 10 depicts a flow diagram of an example process for sharing devices, according to implementations of the present disclosure.

FIG. 10 depicts a flow diagram of an example process for sharing devices, according to implementations of the present disclosure. Operations of the process may be executed by one or more of the user app 402, the backend service 404, the security platform 406, the cloud(s) 410, the native app(s) 412, the C2C authentication 414, and/or the C2C connector 416.

The authorization handshake can be performed (1002) as described above. A second (new) user is associated (1004) with the primary account by the backend service 404, through a request sent by the user app 402 to the backend service 404. The user app 402 can send (1006) a request for the list of managed device(s) to the platform 406, which responds (1008) with the list of device(s). The user app 402 can send (1010) a request to the platform 406 to associate and/or create a user account for the new user. The platform 406 can do so and send (1012) the user app an acknowledgement that the account has been created. The user app 402 can select and specify (1014) the various devices to be accessible by the new user, and/or the permissions for the new user to control the device(s). The user app 402 can send (1016) a request to create a rule for the device(s) and new user association, to the platform 406. The platform 406 can apply 1018 the rule to enable the new user to access information regarding the specified device(s), according to the specified permissions. The platform 406 can send (1020) an acknowledgement to the user app 402 to indicate that the rule has been applied. Following a second authorization 1022 of the new user, the new user can use their own instance of the user app 402 to get THNGs (1024) from the platform 406 and/or otherwise manage devices.

Figure 11:
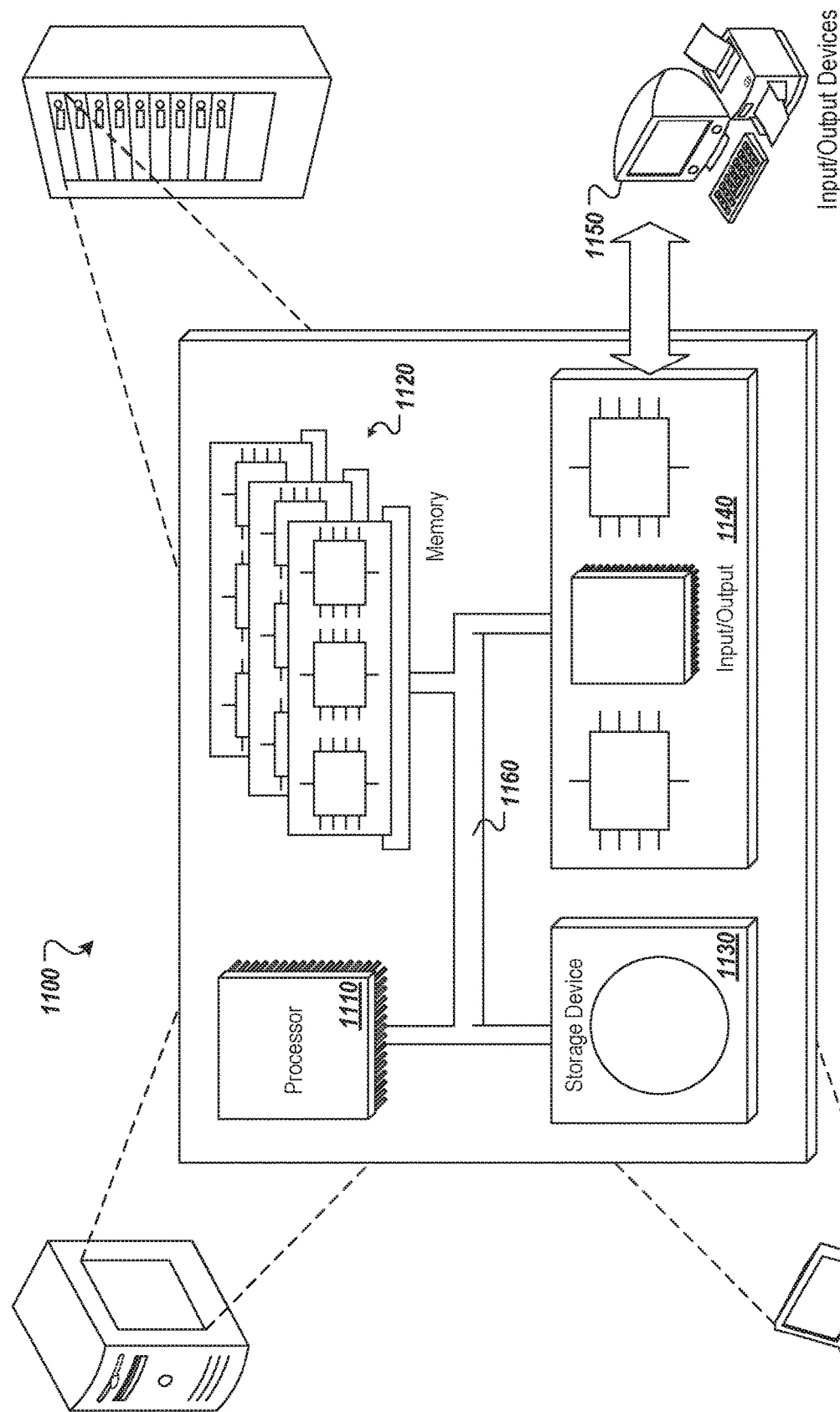
FIG. 11 depicts an example computing system, according to implementations of the present disclosure.

FIG. 11 depicts an example computing system, according to implementations of the present disclosure. The system 1100 may be used for any of the operations described with respect to the various implementations discussed herein. For example, the system 1100 may be included, at least in part, in one or more of the security device 102, the IoT device(s) 104, the local network hub 122, the server device(s) 126, computing device(s) that host the service(s) 116 and/or certificate authority service 118, and/or other computing device(s) or system(s) described herein. The system 1100 may include one or more processors 1110, a memory 1120, one or more storage devices 1130, and one or more input/output (I/O) devices 1150 controllable via one or more I/O interfaces 1140. The various components 1110, 1120, 1130, 1140, or 1150 may be interconnected via at least one system bus 1160, which may enable the transfer of data between the various modules and components of the system 1100.

The processor(s) 1110 may be configured to process instructions for execution within the system 1100. The processor(s) 1110 may include single-threaded processor(s), multi-threaded processor(s), or both. The processor(s) 1110 may be configured to process instructions stored in the memory 1120 or on the storage device(s) 1130. For example, the processor(s) 1110 may execute instructions for the various software module(s) described herein. The processor(s) 1110 may include hardware-based processor(s) each including one or more cores. The processor(s) 1110 may include general purpose processor(s), special purpose processor(s), or both.

The memory 1120 may store information within the system 1100. In some implementations, the memory 1120 includes one or more computer-readable media. The memory 1120 may include any number of volatile memory units, any number of non-volatile memory units, or both volatile and non-volatile memory units. The memory 1120 may include read-only memory, random access memory, or both. In some examples, the memory 1120 may be employed as active or physical memory by one or more executing software modules.

The storage device(s) 1130 may be configured to provide (e.g., persistent) mass storage for the system 1100. In some implementations, the storage device(s) 1130 may include one or more computer-readable media. For example, the storage device(s) 1130 may include a floppy disk device, a hard disk device, an optical disk device, or a tape device. The storage device(s) 1130 may include read-only memory, random access memory, or both. The storage device(s) 1130 may include one or more of an internal hard drive, an external hard drive, or a removable drive.

One or both of the memory 1120 or the storage device(s) 1130 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 1100. In some implementations, the CRSM may include a data store that provides storage of computer-readable instructions or other information in a non-transitory format. The CRSM may be incorporated into the system 1100 or may be external with respect to the system 1100. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 1110 and the memory 1120 may be supplemented by, or incorporated into, one or more application-specific integrated circuits (ASICs).

The system 1100 may include one or more I/O devices 1150. The I/O device(s) 1150 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 1150 may also include one or more output devices such as a display, LED(s), an audio output device (e.g., a speaker), a printer, a haptic output device, and so forth. The I/O device(s) 1150 may be physically incorporated in one or more computing devices of the system 1100, or may be external with respect to one or more computing devices of the system 1100.

The system 1100 may include one or more I/O interfaces 1140 to enable components or modules of the system 1100 to control, interface with, or otherwise communicate with the I/O device(s) 1150. The I/O interface(s) 1140 may enable information to be transferred in or out of the system 1100, or between components of the system 1100, through serial communication, parallel communication, or other types of communication. For example, the I/O interface(s) 1140 may comply with a version of the RS-232 standard for serial ports, or with a version of the IEEE 1284 standard for parallel ports. As another example, the I/O interface(s) 1140 may be configured to provide a connection over Universal Serial Bus (USB) or Ethernet. In some examples, the I/O interface(s) 1140 may be configured to provide a serial connection that is compliant with a version of the IEEE 1394 standard.

The I/O interface(s) 1140 may also include one or more network interfaces that enable communications between computing devices in the system 1100, or between the system 1100 and other network-connected computing systems. The network interface(s) may include one or more network interface controllers (NICs) or other types of transceiver devices configured to send and receive communications over one or more communication networks using any network protocol.

Computing devices of the system 1100 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 1100 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method performed by a security computing device, the method comprising:
 receiving, by the security computing device, a communication sent from a first Internet of Things (IoT) device of a plurality of IoT devices communicatively coupled to the security computing device, the communication identifying an external service to receive the communication;
 accessing, by the security computing device, a digital certificate associated with the first IoT device from a blockchain network that is accessible by the security computing device, wherein the digital certificate is configured to be used by the security computing device to manage communications between the plurality of IoT devices and a plurality of external services;
monitoring, by the security computing device, status information of other IoT devices of the plurality of IoT devices to determine whether to send the communication received from the first IoT device to the external service, wherein at least a portion of the status information of the other IoT devices is stored in the blockchain network; and
sending, by the security computing device, the communication received from the first IoT device to the external service over a secure connection that is established between the security computing device and the external service using the digital certificate.

2. The method of claim 1, wherein the status information of the other IoT devices of the plurality of IoT devices relates to the provision of a utility service relative to the plurality of IoT devices.

3. The method of claim 1, wherein monitoring, by the security computing device, the status information of the other IoT devices of the plurality of IoT devices relative to the communication received from the first IoT device comprises detecting issues with respect to power consumption and/or power distribution via the other IoT devices.

4. The method of claim 1, wherein monitoring, by the security computing device, the status information of the other IoT devices of the plurality of IoT devices relative to the communication received from the first IoT device comprises detecting a water service outage via the other IoT devices.

5. The method of claim 1, wherein monitoring, by the security computing device, the status information of the other IoT devices of the plurality of IoT devices relative to the communication received from the first IoT device comprises using artificial intelligence to divert supply of a utility service between the plurality of IoT devices.

6. The method of claim 1, wherein the digital certificate is received from a certificate authority service based on establishing a trust relationship between the security computing device and the certificate authority service.

7. The method of claim 1, comprising:
detecting, by the security computing device, a presence of the first IoT device on an IoT network that is accessible, over one or more networks, by the security computing device; and
adding, by the security computing device, the first IoT device to the plurality of IoT devices for which external communications are managed by the security computing device.

8. The method of claim 7, wherein adding the first IoT device comprises updating configuration data to include a description of the first IoT device, the configuration data stored on the security computing device.

9. The method of claim 1, wherein:
the blockchain network stores payment information;
the communication indicates a transaction with the external service; and
the security computing device employs the payment information to initiate the transaction, for the first IoT device, with the external service.

10. The method of claim 1, comprising:
providing, by the security computing device, a user interface that presents the status information regarding the first IoT device, the user interface accessible through a biometric authentication mode.

11. A security computing device comprising:
at least one processor; and
memory communicatively coupled to the at least one processor, the memory storing instructions which, when executed by the at least one processor, cause the at least one processor to perform operations comprising:
receiving a communication sent from a first Internet of Things (IoT) device of a plurality of IoT devices communicatively coupled to the security computing device, the communication identifying an external service to receive the communication;
accessing a digital certificate associated with the first IoT device from a blockchain network that is accessible by the security computing device, wherein the digital certificate is configured to be used by the security computing device to manage communications between the plurality of IoT devices and a plurality of external services;
monitoring status information of other IoT devices of the plurality of IoT devices to determine whether to send the communication received from the first IoT device to the external service, wherein the status information of the other IoT devices is stored in the blockchain network; and
sending the communication received from the first IoT device to the external service over a secure connection that is established between the security computing device and the external service using the digital certificate.

12. The security computing device of claim 11, wherein the status information of the other IoT devices of the plurality of IoT devices relates to the provision of a utility service relative to the plurality of IoT devices.

13. The security computing device of claim 11, wherein monitoring the status information of the other IoT devices of the plurality of IoT devices relative to the communication received from the first IoT device comprises detecting issues with respect to power consumption and/or power distribution via the other IoT devices.

14. The security computing device of claim 11, wherein monitoring the status information of the other IoT devices of the plurality of IoT devices relative to the communication received from the first IoT device comprises detecting a water service outage via the other IoT devices.

15. The security computing device of claim 11, wherein monitoring the status information of the other IoT devices of the plurality of IoT devices relative to the communication received from the first IoT device comprises using artificial intelligence to divert supply of a utility service between the plurality of IoT devices.

16. The security computing device of claim 11, wherein the digital certificate is received from a certificate authority service based on establishing a trust relationship between the security computing device and the certificate authority service.

17. The security computing device of claim 11, the operations comprising:
detecting a presence of the first IoT device on an IoT network that is accessible, over one or more networks, by the security computing device; and
adding the first IoT device to the plurality of IoT devices for which external communications are managed by the security computing device.

18. The security computing device of claim 17, wherein adding the first IoT device comprises updating configuration data to include a description of the first IoT device, the configuration data stored on the security computing device.

19. The security computing device of claim 11, wherein:
the blockchain network stores payment information;
the communication indicates a transaction with the external service; and
the security computing device employs the payment information to initiate the transaction, for the first IoT device, with the external service.

20. The security computing device of claim 11, comprising:
providing a user interface that presents the status information regarding the first IoT device, the user interface accessible through a biometric authentication mode.

* * * * *